United States Patent
Weiher et al.

(10) Patent No.: US 9,617,448 B2
(45) Date of Patent: Apr. 11, 2017

(54) CLEARCOAT COATING COMPOSITION, METHOD FOR PRODUCTION AND USE

(71) Applicant: BASF Coatings GmbH, Münster (DE)

(72) Inventors: Christian Weiher, Münster (DE); Günter Klein, Münster (DE); Andreas Poppe, Karlstadt (DE); Ulrike Clausen-Meiring, Senden (DE); Helmut Kleine Beckmann, Ostbevern (DE); Corinna Außmann, Hamm (DE); Thomas Leitner, Münster (DE)

(73) Assignee: BASF Coatings GmbH, Muenster (DE)

( * ) Notice: Subject to any disclaimer, the term of this patent is extended or adjusted under 35 U.S.C. 154(b) by 178 days.

(21) Appl. No.: 14/374,389

(22) PCT Filed: Feb. 1, 2013

(86) PCT No.: PCT/EP2013/052070
§ 371 (c)(1),
(2) Date: Jul. 24, 2014

(87) PCT Pub. No.: WO2013/113893
PCT Pub. Date: Aug. 8, 2013

(65) Prior Publication Data
US 2014/0378587 A1    Dec. 25, 2014

Related U.S. Application Data

(60) Provisional application No. 61/594,396, filed on Feb. 3, 2012.

(30) Foreign Application Priority Data

Feb. 3, 2012    (EP) ..................... 12153865

(51) Int. Cl.
*C09D 167/00* (2006.01)
*B05D 3/02* (2006.01)

(52) U.S. Cl.
CPC ............. *C09D 167/00* (2013.01); *B05D 3/02* (2013.01); *C08L 2205/02* (2013.01); *C08L 2205/025* (2013.01); *C08L 2205/03* (2013.01); *C08L 2205/035* (2013.01)

(58) Field of Classification Search
CPC ........................... C08G 63/137; C09D 167/02
See application file for complete search history.

(56) References Cited

U.S. PATENT DOCUMENTS

| | | | |
|---|---|---|---|
| 4,246,382 A | 1/1981 | Honda et al. | |
| 4,728,555 A * | 3/1988 | Kiessling | C09D 5/4438 |
| | | | 525/523 |
| 5,102,961 A | 4/1992 | Blank | |
| 5,576,386 A | 11/1996 | Kempter et al. | |
| 5,690,569 A | 11/1997 | Ledvina et al. | |
| 5,726,258 A | 3/1998 | Fischer et al. | |
| 5,948,851 A * | 9/1999 | Anton | C08G 18/6275 |
| | | | 524/520 |
| 5,990,221 A | 11/1999 | Dames et al. | |
| 6,063,448 A | 5/2000 | Duecoffre et al. | |
| 6,160,049 A | 12/2000 | Mathauer et al. | |
| 6,410,646 B1 | 6/2002 | Rockrath et al. | |
| 6,652,916 B1 * | 11/2003 | Baumgart | C08G 18/2865 |
| | | | 427/385.5 |
| 6,737,468 B1 | 5/2004 | Bremser | |
| 7,122,161 B1 | 10/2006 | Moritz et al. | |
| 2003/0138650 A1* | 7/2003 | Fay | C08G 18/10 |
| | | | 428/482 |

FOREIGN PATENT DOCUMENTS

| | | |
|---|---|---|
| DE | 2848906 | 5/1979 |
| DE | 19524182 | 1/1997 |
| DE | 19525375 | 1/1997 |
| DE | 19709476 | 11/1997 |
| DE | 19628142 | 1/1998 |
| DE | 19628143 | 1/1998 |
| DE | 19709465 | 9/1998 |
| DE | 19828742 | 12/1999 |
| DE | 19930665 | 1/2001 |
| EP | 0554783 | 8/1993 |
| EP | 0837891 | 4/1998 |
| WO | WO-82/02387 | 7/1982 |
| WO | WO-95/27742 | 10/1995 |
| WO | WO-97/03102 | 1/1997 |
| WO | WO-98/02466 | 1/1998 |
| WO | WO-2007/068683 | 6/2007 |

OTHER PUBLICATIONS

PCT International Search Report in PCT/EP2013/052070, dated Mar. 21, 2013, 2 pages.
PCT International Preliminary Report on Patentability in PCT/EP2013/052070, mailed Aug. 14, 2014, 8 pages.

* cited by examiner

*Primary Examiner* — Brieann R Fink
(74) *Attorney, Agent, or Firm* — Servilla Whitney LLC

(57) ABSTRACT

Described is a clearcoat coating composition, its use, and a process for preparing the clearcoat coating composition. The clearcoat coating composition comprises (A) at least one polyester having an OH number of 80-250 mg KOH/g; (B) at least one butanol-etherified melamine-formaldehyde resin having a crosslinking onset temperature between 65° C.-100° C. lower than the crosslinking onset temperature of hexamethoxy-methylmelamine; (C) at least one butanol-etherified melamine-formaldehyde resin having a crosslinking onset temperature between 30° C.-60° C. lower than the crosslinking onset temperature of hexamethoxymethyl-melamine; (D) at least one organic urea compound as rheological assistant; and (E) at least one acid catalyst.

15 Claims, No Drawings

CLEARCOAT COATING COMPOSITION, METHOD FOR PRODUCTION AND USE

CROSS-REFERENCE TO RELATED APPLICATIONS

This application is the National State entry of PCT/EP2013/052070, filed on Feb. 1, 2013, which claims priority to U.S. Provisional Application Ser. No. 61/594,396, filed on Feb. 3, 2012 and European Patent Application No. 12153865.6, filed Feb. 3, 2012, the disclosures of which are incorporated herein by reference in their entireties.

TECHNICAL FIELD

The present invention relates to a clearcoat coating composition comprising at least one polyester, at least two melamine-formaldehyde resins having different reactivities, at least one urea compound as rheological assistant, and at least one acid catalyst. The present invention further relates to the preparation of the clearcoat coating composition and to the use thereof for coating various substrates.

BACKGROUND

In present-day automotive finishing, various substrates, such as, for example, bodies and bodywork parts made of metal or plastic, are painted. In addition to single-coat finishes, multicoat paint systems are frequently also built up. Multicoat paint systems on metallic substrates consist in general of an electrocoat, a primer-surfacer coat, a basecoat and a clearcoat. In the case of plastics substrates, either single-coat finishes or, again, multicoat paint systems are built up. In the latter case, the customary primer-surfacer, single-coat topcoat, basecoat and clearcoat coating compositions that are employable in the finishing of plastics are used, their selection and use being known to the skilled person.

The exacting technological and optical requirements imposed on paint finishes in the sector of the present-day automobile industry, and also the functions and technological properties of each of the individual paint coats identified above, are known to the skilled person. The clearcoats determine such essential optical properties as, for example, the gloss and the distinctiveness of image (DOI) and/or the appearance of the painted surface. This appearance is influenced to a particular degree by the roughness or waviness of the surface. Whereas a rough surface leads to a relatively nonuniform, optically unadvantageous aspect, a particularly smooth, regular surface possesses a good appearance. The clearcoat coating composition with which the clearcoat is produced must therefore have corresponding properties so that the appearance of the resultant finish is in keeping with the exacting requirements of the automobile industry. These requirements include, more particularly, good leveling properties and good filling capacity on the part of the clearcoat coating composition. By this means it is possible, for example, to compensate unevennesses in the substrate, in order to obtain a surface of maximum smoothness. In conventional multicoat paint systems, this is commonly brought about by the coats situated below the clearcoat, more particularly by the primer-surfacer coat. In order to boost the efficiency of painting operations, at the same time as aiming for cost minimization, however, it is becoming more and more important for the clearcoat coating compositions as well to have the stated properties. Thus, for example, as part of painting operations, attempts are made to be able to use steel substrates as well, which have a greater roughness and are therefore more cost-effective. This higher roughness, however, has to date often not been adequately masked by the coats situated beneath the clearcoat, with the consequence that the clearcoat coating composition used must also have a good filling capacity, in order to achieve a good appearance. A further factor is that, as part of operational optimization, the flashing and drying times of the non-topcoat coats are often reduced, with the consequence that a maximum flow effect is not achieved here. Furthermore, attempts are being made to reduce the thicknesses of the coats to an ever further extent, or even to omit individual coats entirely, as part of innovative coating operations. For these reasons as well, the function of hiding unevennesses is increasingly being shifted to the clearcoat as well. It is important, correspondingly, that clearcoat coating compositions have a good filling capacity and hence contribute to an outstanding appearance on the part of the painted surface.

EP 0 837 891 B1 discloses a method for the multicoat painting of automobiles using transparent coating materials which are distinguished, for example, by a good topcoat appearance, more particularly gloss. The coating material here comprises a specific binder combination, using, among others, a (meth)acrylate copolymer, a polyester, a blocked isocyanate and a melamine resin.

Within the automobile industry, however, there continues to be a need for improvements with regard to the visual appearance of painted surfaces.

A further factor is that nowadays, as another requirement imposed on coating materials, more particularly on solventborne clearcoat coating compositions, increasing the nonvolatile fraction (NVF) of these compositions stands as the focal point of the coatings industry. Through a slight increase in the NVF and, consequently, a reduction in the fraction of volatile organic compounds, more particularly solvents, the systems can be made more eco-friendly. Moreover, just a small increase in the NVF produces a lower level of materials consumption/a higher productivity in coating, and hence, as part of large-scale industrial coating plants with correspondingly high throughput rates, achieves a large saving on material and ultimately operates significantly more economically and in turn in a more eco-friendly manner. It is an important objective on the part of the coatings industry, accordingly, to achieve a steady increase in the NVF or reduction in VOC emissions while at the same time preserving the technological properties of the respective coating compositions—clearcoat coating compositions for example.

In spite of efforts in this vein by the automobile industry, it has not to date been possible satisfactorily to achieve the above-identified properties for clearcoat coating compositions. Accordingly, a clearcoat coating composition which has a good filler capacity and good leveling and can therefore be utilized for producing coatings on substrates, more particularly bodies and bodywork parts, made of metal or plastic, from the automotive finishing segment is needed. The coatings ought accordingly to have a high gloss and more particularly an outstanding appearance. Additionally, it is desired toincrease the nonvolatile fraction of the clearcoat coating composition while at the same time preserving the technological properties, more particularly the appearance, and, hence, to acheive an economic and environmental profile which is improved by comparison with technologically comparable or even poorer compositions.

SUMMARY

A first aspect of the present invention is directed to a clearcoat coating composition. In a first embodiment, a clearcoat coating composition comprises (A) at least one polyester having an OH number of 100-220 mg KOH/g, comprising (A1) 10 to 20 mol % of at least one acyclic, aliphatic, branched polyol having two hydroxyl groups, (A2) 5 to 15 mol % of at least one acyclic, aliphatic, branched polyol having three hydroxyl groups, (A3) 10 to 20 mol % of at least one acyclic, aliphatic, branched polyol having four hydroxyl groups, (A4) 25 to 40 mol % of at least one cycloaliphatic 1,2-dicarboxylic acid and/or the anhydride of this dicarboxylic acid, and (A5) 20 to 35 mol % of isononanoic acid, wherein the molar fractions are based in each case on the total molar fraction of the compounds (A1) to (A5) and wherein this total molar fraction accounts for at least 70 mol % of the compounds present in the polyester (A); (B) at least one butanol-etherified melamine-formaldehyde resin having a crosslinking onset temperature between 65° C.-100° C. lower than the crosslinking onset temperature of hexamethoxymethylmelamine; (C) at least one butanol-etherified melamine-formaldehyde resin having a crosslinking onset temperature between 30° C.-60° C. lower than the crosslinking onset temperature of hexamethoxymethylmelamine; (D) at least one organic urea compound as rheological assistant; and (E) at least one acid catalyst.

In a second embodiment, the clearcoat coating composition of the first embodiment is modified, wherein the clearcoat coating composition comprises the at least one polyester (A) in an amount of 12% to 45% by weight, the at least one butanol-etherified melamine-formaldehyde resin (B) in an amount of 2% to 10% by weight, the at least one butanol-etherified melamine-formaldehyde resin (C) in an amount of 5% to 20% by weight, the at least one organic urea compound (D) as rheological assistant in an amount of 0.1% to 7% by weight, and the at least one acid catalyst in an amount of 0.01 to 3% by weight, based in each case on the total amount of the clearcoat coating composition.

In a third embodiment, the clearcoat coating composition of the first embodiment is modified, wherein the clearcoat coating composition further comprises at least one (meth)acrylate (co)polymer (DD) having a glass transition temperature of −40° C. to 70° C. and an OH number of 60 to 200 mg KOH/g.

In a fourth embodiment, the clearcoat coating composition of the second embodiment is modified, wherein the clearcoat coating composition further comprises at least one (meth)acrylate (co)polymer (DD) having a glass transition temperature of −40° C. to 70° C. and an OH number of 60 to 200 mg KOH/g in an amount of 5% to 20% by weight, based on the total amount of the clearcoat coating composition.

In a fifth embodiment, the clearcoat coating composition of the first embodiment or of the third embodiment is modified, wherein the clearcoat coating composition further comprises at least one organic solvent.

In a sixth embodiment, the clearcoat coating composition of the second embodiment or of the fourth embodiment is modified, wherein the clearcoat coating composition further comprises at least one organic solvent in an amount of 10% to 60% by weight, based on the total amount of the clearcoat coating composition.

In seventh embodiment, the clearcoat coating composition of the first through sixth embodiments is modified, wherein the clearcoat coating composition further comprises at least one tris(alkoxycarbonylamino)-1,3,5-triazine, in an amount of 0.5% to 10% by weight, based on the total amount of the clearcoat coating composition.

In an eighth embodiment, the clearcoat coating composition of the first through seventh embodiments is modified, wherein the at least one organic urea compound as rheological assistant is an adduct of a polyisocyanate and an araliphatic or aliphatic primary monoamine.

In a ninth embodiment, the clearcoat coating composition of the first through eighth embodiments is modified, wherein the acid catalyst is a sulfonic acid catalyst selected from the group consisting of free sulfonic acids and amine-blocked sulfonic acids.

A second aspect of the present invention is directed to a process. In a tenth embodiment, a process for preparing the clearcoat coating composition of the first through ninth embodiments comprises mixing the components (A), (B), (C), (D), and (E).

In an eleventh embodiment, the process of the tenth embodiment is modified, wherein the urea compound is added in the form of a paste which comprises a mixture of the urea compound with a polyester and/or with a (meth)acrylate (co)polymer and at least one organic solvent.

In a twelfth embodiment, the process of the eleventh embodiment is modified, wherein the paste comprises a (meth)acrylate (co)polymer (DD).

A third aspect of the present invention is directed to a method. In a thirteenth embodiment, a method for producing a cured clearcoat on a substrate comprises applying the clearcoat coating composition of the first through ninth embodiments to a substrate and subsequently thermally curing at a temperature of 80 to 180° C.

In a fourteenth embodiment, the method of the thirteenth embodiment is modified, wherein the substrate comprises a precoated substrate having an existing paint coat, and the clearcoat coating composition is applied to the precoated substrate and optionally cured beforehand, to produce a multicoat paint system.

A fourth aspect of the present invention is directed to a multicoat coating. In a fifteenth embodiment, a multicoat coating is produced according to the method of the fourteenth embodiment.

Provided is a clearcoat coating composition comprising
(A) at least one polyester
    having an OH number of 100-220 mg KOH/g,
    comprising
    (A1) 10 to 20 mol % of at least one acyclic, aliphatic, branched polyol having two hydroxyl groups,
    (A2) 5 to 15 mol % of at least one acyclic, aliphatic, branched polyol having three hydroxyl groups,
    (A3) 10 to 20 mol % of at least one acyclic, aliphatic, branched polyol having four hydroxyl groups,
    (A4) 25 to 40 mol % of at least one cycloaliphatic 1,2-dicarboxylic acid and/or the anhydride of this dicarboxylic acid, and
    (A5) 20 to 35 mol % of isononanoic acid,
    the stated molar fractions being based in each case on the total molar fraction of the compounds (A1) to (A5) and this total molar fraction accounts for at least 70 mol % of the compounds present in the polyester (A);
(B) at least one butanol-etherified melamine-formaldehyde resin
    having a crosslinking onset temperature between 65° C.-100° C. lower than the crosslinking onset temperature of hexamethoxymethylmelamine;
(C) at least one butanol-etherified melamine-formaldehyde resin
    having a crosslinking onset temperature between 30° C.-60° C. lower than the crosslinking onset temperature of hexamethoxymethylmelamine;
(D) at least one organic urea compound as rheological assistant; and (E) at least one acid catalyst.

This clearcoat coating composition is s referred to accordingly as clearcoat coating composition of the invention. Further embodiments are apparent from the description which follows. The clearcoat coating composition of the invention possesses an outstanding filler capacity and/or good leveling, and so is suitable for producing coatings which exhibit a particularly smooth surface and hence a high gloss and also, in particular, an outstanding appearance. Moreover, in comparison to coatings having similar or even poorer technological properties, the clearcoat coating composition has an increased nonvolatile fraction and hence exhibits a significantly improved environmental profile. The clearcoat coating composition may serve to construct a clearcoat which either on its own or as part of a multicoat paint system covers a metallic or plastics substrate.

Likewise provided is a process for preparing the clearcoat coating composition of the invention, and also the use thereof for producing a coating or cured clearcoat on a substrate. Likewise provided is a clearcoat produced with the clearcoat coating composition of the invention on a substrate.

In the context of the present invention, the conditions selected for determining nonvolatile fractions (NVF, solids) were constant in each case unless otherwise specified. For the determination of the nonvolatile fraction, an amount of 2 g of the sample in question is applied to a solid-body lid and heated at 125° C. for 2 hours, then cooled to room temperature and subsequently weighed again (cf. ISO 3251). Determinations were made of the nonvolatile fraction of, for example, corresponding polymer solutions and/or resins which are present in the clearcoat coating composition of the invention, in order thereby to allow, for example, the setting and determination of the weight fraction of the respective constituent in a mixture of two or more constituents or in the clearcoat coating composition as a whole.

As used herein, the terms "hydroxyl number" or "OH number" refer to the amount of potassium hydroxide in milligrams that is equivalent to the molar amount of acetic acid bound on acetylation of one gram of the respective constituent. The hydroxyl number is determined, in the context of the present invention, unless indicated otherwise, in accordance with DIN 53240-2 (Determination of hydroxyl value—Part 2: Method with catalyst) experimentally by titration.

As used herein, the term "acid number" refers to the amount of potassium hydroxide in milligrams which is needed to neutralize 1 g of the respective constituent. The acid number is determined, in the context of the present invention, unless otherwise indicated, in accordance with DIN EN ISO 2114 experimentally by titration.

The mass-average ($M_w$) and number-average ($M_n$) molecular weights are determined, in the context of the present invention, by means of gel permeation chromatography at 40° C., using a high-pressure liquid chromatography pump and a refractive index detector. The eluent used was tetrahydrofuran, with an elution rate of 1 mL/min. Calibration is carried out using polystyrene standards.

The glass transition temperature $T_g$ is determined, in the context of the invention, experimentally in a method based on DIN 51005 "Thermal Analysis (TA)—Terms" and DIN 53765 "Thermal Analysis—Dynamic Scanning calorimetry (DSC)". It involves weighing out a sample of 10 mg into a sample boat and introducing it into a DSC instrument. It is cooled to the starting temperature and then a 1st and 2nd measurement run is carried out under an inert gas blanket ($N_2$) of 50 mL/min with a heating rate of 10 K/min, with cooling to the starting temperature again between the runs. Measurement typically takes place in the temperature range from about 50° C. lower than the expected glass transition temperature to about 50° C. higher than the glass transition temperature. The glass transition temperature, in the context of the present invention, based on DIN 53765, section 8.1, is the temperature in the 2nd measurement run at which half of the change in specific heat capacity (0.5 delta $c_p$) is attained. It is determined from the DSC diagram (plot of the heat flow against the temperature), and is the temperature of the point of intersection of the middle line between the extrapolated baselines before and after the glass transition with the measurement curve.

The crosslinking onset temperature of melamine-formaldehyde resins is determined, in the context of the invention, experimentally by means of Dynamic Mechanical Analysis (DMA). This method is described for example in DIN EN ISO 6721-1, the method in that standard being explained in the context of the determination of dynamic mechanical properties of plastics. In DMA, an oscillating force is applied to the sample to ascertain, in a frequency-dependent and temperature-dependent manner, the viscoelastic properties (in other words the stiffness, expressed by the measured storage modulus E', and the dissipated work per vibration, expressed by the measured loss modulus E") of the sample. The stiffer a material is, the greater is the value of the storage modulus—that is, the material presents a greater resistance to its elastic deformation. For a composition of crosslinkable polymer chains, as for example a melamine-formaldehyde resin, the stiffness increases when the crosslinking of the individual polymer chains with one another begins and thus, from a mixture of individual polymer chains, a complex network, or a film, is formed. In the context of the present invention, the DMA determines the storage modulus by subjecting the sample to a sinusoidal vibration of constant amplitude and frequency with a continuous increase in temperature. The temperature at which the storage modulus begins to increase is identified in the context of the present invention as the crosslinking onset temperature of the melamine-formaldehyde resins. The measurements were carried out using a DMTA IV instrument from Rheometric Scientific. For these measurements, 1 g of the respective melamine-formaldehyde resin to be measured (solids 50%, adjusted using n-butanol) is applied to a glass fiber mesh which is clamped into the measuring instrument, and the storage modulus E' is measured with a continuous temperature increase of 2° C. per minute and with sinusoidal exposure of the sample (constant frequency, constant amplitude in the linear measurement range). Measurement takes place usually in the temperature range from about 80-100° C. lower than the expected crosslinking onset temperature to about 80-100° C. higher than the crosslinking onset temperature. The crosslinking onset temperature is then determined graphically from the storage modulus/temperature diagram, and is the temperature of the point of intersection of the extrapolated baseline of the storage modulus before crosslinking begins and of the extrapolated line resulting from the quasi-linear increase region of the storage modulus after the onset of crosslinking. In this way, the crosslinking onset temperature can be readily determined to an accuracy of +/−1° C.

Polyester (A)

The first essential constituent of the clearcoat coating composition of the invention is at least one polyester (A) as described below.

A polyester is generally a polymeric organic compound which is prepared using polyhydric organic polyols and polybasic organic carboxylic acids. The polyols and polycarboxylic acids here are linked with one another by esterification, in other words by condensation reactions. Accordingly, the polyesters are generally classed in the group of the polycondensation resins. Depending on the nature, functionality and fractions and proportions that are used of the starting components, linear or branched products, for example, are obtained. Whereas linear products are formed primarily when difunctional starting components (diols, dicarboxylic acids) are used, the use of alcohols with a higher functionality (OH functionality, in other words number of OH groups per molecule, of more than 2) produces branching. In the preparation process it is of course also possible to make proportional use of monofunctional components, as for example monocarboxylic acids. For the preparation of the polyesters it is also possible, as is known, to use the anhydrides of the carboxylic acids, more particularly the anhydrides of the dicarboxylic acids, instead of or in addition to the corresponding organic carboxylic acids. Likewise possible is preparation through the use of hydroxycarboxylic acids or the lactones which are derived from the hydroxycarboxylic acids by intramolecular esterification.

Very generally, in the preparation of polyesters, it is possible to employ polycarboxylic acids and polyols, as for example aliphatic polycarboxylic acids and aliphatic polyols.

Aliphatic compounds are, as is known, acyclic or cyclic, saturated or unsaturated hydrocarbon compounds. The term "aliphatic compound" thus encompasses acyclic and cyclic aliphatics and is considered to be a corresponding generic term in the context of the present invention as well. In the context of the present invention the noncyclic aliphatics are referred to as acyclic aliphatics, and the cyclic aliphatics as cycloaliphatics. The acyclic aliphatics may be linear or branched. Linear means, as is known, that the compound in question has no branching in terms of the carbon chain, but that, instead, the carbon atoms are arranged exclusively in linear sequence in a chain. Branched or nonlinear therefore means, in the context of the present invention, that the particular compound under consideration has branching in the carbon chain—that is, at least one carbon atom in the compound in question is a tertiary carbon atom. Cycloaliphatics are, as is known, those compounds in which at least some of the carbon atoms present are linked in the molecule in such a way as to form one or more rings. In addition to the one or more rings, of course, there may be other acyclic linear or branched aliphatic groups present.

The term "aliphatic polycarboxylic acid" is applied, accordingly, to those polycarboxylic acids which in addition to their carboxylic acid groups have aliphatic groups, i.e., consist of carboxylic acid groups and aliphatic groups. This form of designation also applies to all other classes of compound specified in the context of the present invention, as for example to the aforementioned polyols.

It is likewise possible to employ aromatic polycarboxylic acids and aromatic polyols or else polycarboxylic acids and polyols which in addition to their functional groups designating their class of compound have not only (linear, branched and/or cyclic) aliphatic but also aromatic groups. Likewise possible is the use of linear, branched and/or cyclic aliphatic and/or aromatic hydroxycarboxylic acids and also lactones—that is, hydroxycarboxylic acids and lactones which, in addition to their functional groups denoting their class of compound, have linear, branched and/or cyclic aliphatic and/or aromatic groups.

Suitable diols are, for example, glycols, such as ethylene glycol, propylene glycol, butylene glycol, butane-1,4-diol, hexane-1,6-diol, neopentyl glycol, and other diols, such as 1,4-dimethylolcyclohexane or 2-butyl-2-ethyl-1,3-propanediol. The diols stated are preferably the only diols present.

Suitable more highly functional alcohols (OH functionality greater than 2) are, for example, trimethylolpropane, glycerol, and pentaerythritol. The more highly functional alcohols stated are preferably the only more highly functional alcohols present.

The acid component of a polyester generally comprises dicarboxylic acids or their anhydrides having 2 to 44, specifically 4 to 36, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedi-carboxylic acid, tetrachlorophthalic acid and/or dimerized fatty acids. In place of these acids it is also possible to use their anhydrides, where they exist. It is also possible to use more highly functional carboxylic acids having 3 or more carboxyl groups (and/or the corresponding anhydrides), as for example trimellitic anhydride. Frequently use is also made proportionally of monocarboxylic acids, such as unsaturated fatty acids, for example. The dicarboxylic acids and more highly functional carboxylic acids stated are preferably the only dicarboxylic acids and more highly functional carboxylic acids—including their anhydrides—present.

Examples of hydroxycarboxylic acids which can be used are hydroxycaproic acid, hydroxybutyric acid, hydroxydecanoic acid and/or 12-hydroxystearic acid. Examples of lactones which can be used are the conventional beta-, gamma-, delta-, and epsilon-lactones, more particularly epsilon-caprolactone.

Besides the monomeric compounds described above it is also possible, for example, to use starting products that are already polymeric—for example, as diols, the conventional polyester diols obtained by reacting a lactone with a dihydric alcohol.

The preparation of polyesters does not exhibit any peculiarities in terms of process, and is generally accomplished via the polymerization processes that are known and customary per se, more particularly polycondensation processes, as for example in bulk or in solution at temperatures of preferably 50 to 300° C., using, where appropriate, the catalysts typical for such reactions, such as, for example, acids (for example, concentrated sulfuric acid), dibutyltin laurate or other tin-based catalysts, obtainable, for example, under the trade name Fascat (an example being Fascat 4100). The water arising from the condensation reactions is removed typically by means of a water separator. One exemplary preparation process can be found in the examples given below.

The at least one polyester (A) present in the clearcoat coating composition of the invention is a specific polyester which may comprise the compounds described above, more particularly the monomeric compounds, but must in any case have the features identified later on below. The polyester (A) can also be prepared under the conditions described above. Where it is stated, in the context of the present invention, that a polymer, as for example the polyester (A), comprises particular compounds, this means that these particular compounds are used as starting compounds in the preparation of the polymer in question, as for example of a polyester (A). Depending on the nature of the starting compounds, the respective reaction to form the polymer takes place according to various mechanisms. Thus, for example, in the condensation reaction of an alcohol and a carboxylic acid, as is known, one molecule of water is eliminated for each ester bond formed. This molecule of water is then of course no longer present in the polyester prepared. Nevertheless, apart from the water, the polyester of course comprise the two compounds—the alcohol and the carboxylic acid. Accordingly, for ease of comprehension, it is said that the polymer in question comprises the compounds. The meaning of the expression "the polymer comprises compounds V" should therefore be equated with the meaning of the expression "compounds V were used in the preparation of the polymer".

In accordance with the invention the polyester (A) comprises
(A1) 10 to 20 mol % of at least one acyclic, aliphatic, branched polyol having two hydroxyl groups,
(A2) 5 to 15 mol % of at least one acyclic, aliphatic, branched polyol having three hydroxyl groups,
(A3) 10 to 20 mol % of at least one acyclic, aliphatic, branched polyol having four hydroxyl groups,
(A4) 25 to 40 mol % of at least one cycloaliphatic 1,2-dicarboxylic acid and/or the anhydride of this dicarboxylic acid, and
(A5) 20 to 35 mol % of isononanoic acid,
the stated molar fractions being based in each case on the total molar fraction of the compounds (A1) to (A5) and this total molar fraction accounting for at least 70 mol %, preferably at least 85 mol %, of the compounds present in the polyester (A) (that is, starting compounds). With very particular preference the polyester (A) consists of the compounds (A1) to (A5).

In each case, therefore, the at least one polyester (A) comprises the monocarboxylic acid isononanoic acid. It is also referred to, accordingly, as isononanoic acid-modified polyester.

In one or more embodiments, the fraction of the at least one polyester (A) is 12% to 45% by weight, more particularly 15% to 40% by weight, very particularly 18% to 30% by weight, based in each case on the total amount of the clearcoat coating composition of the invention.

The at least one polyester (A) is OH-functional and has an OH number of 100-220 mg KOH/g, specifically 120-200 mg KOH/g, very specifically of 140-180 mg KOH/g.

The at least one polyester (A) may comprise carboxyl functions. In one or more embodiments, the acid number is less than 30 mg KOH/g, more particularly 10-15 mg KOH/g.

In one or more embodiments, the at least one polyester (A) has a weight-average molecular weight $M_w$ of 2900 to 4100 g/mol, more specifically 3250 to 3800 g/mol, and a number-average molecular weight $M_n$ of between 1000 to 1500 g/mol, more specifically 1100 to 1300 g/mol.

In one or more embodiments, in the polyester (A) is 2-butyl-2-ethyl-1,3-propanediol as compound (A1), trimethylolpropane as compound (A2), pentaerythritol as compound (A3), and hexahydrophthalic anhydride as compound (A4). This polyester (A) leads, surprisingly, to quite excellent performance properties on the part of the clearcoat coating composition of the invention, and results more particularly in a high gloss and a very uniform appearance on the part of the coatings produced using the clearcoat coating composition.

Melamine-Formaldehyde Resins (B) and (C)

The clearcoat coating composition of the invention further comprises at least one melamine-formaldehyde resin (B) as defined below and at least one different melamine-formaldehyde resin (C) as defined below.

Melamine-formaldehyde resins are products formed from melamine (1,3,5-triazine-2,4,6-triamine) and a maximum of 6 mol of formaldehyde per mole. For the melamine resins generally, however, it is also possible, for example, for aldehydes with carbon chains to be used, more particularly aldehydes having 2 to 8 carbon atoms. Examples of specific aldehydes are formaldehyde, acetaldehyde, propyl aldehyde or butyraldehyde; in general, formaldehyde, and hence the melamine-formaldehyde resins, are used in specific embodiments.

Reaction of the amino groups of the melamine with the formaldehyde results in reaction products containing methylol groups, it being possible for a total of 2 formaldehyde molecules to be added per amino group, or for one formaldehyde to be added per N—H unit. From this methylolamines it is then possible, for example, by condensation reactions, for various adducts to be formed, containing two or more melamine nuclei, with these nuclei then being linked, for example, via corresponding ether bridges. Melamine-formaldehyde resins are therefore constructed from molecules which are monocyclic or polycyclic—that is, the molecules may contain one triazine ring ("monocyclic") or two or more triazine nuclei ("polycyclic").

These adducts may of course have various degrees of methylolation and hence may also still contain free, reactive N—H units (melamine-formaldehyde resins containing imino groups). The melamine-formaldehyde resins containing a high level of free imino groups (known as high-imino melamine-formaldehyde resins) are comparatively reactive and react (crosslink) with themselves (self-condensation) or else, for example, with a particular OH-functional polymer, as for example a polyester (A), under correspondingly constantly chosen reaction conditions (for example, constant temperature or on use of constant amounts of a defined catalyst) substantially more quickly than is the case for melamine-formaldehyde resins having a high degree of methylolation. Accordingly, for the attainment of a particular degree of crosslinking within a given time frame, lower temperatures and/or catalyst quantities are needed. In just the same way, for the onset of crosslinking and/or self-crosslinking, a lower temperature is needed under otherwise constant conditions. The degree of methylolation of a melamine resin describes the number of possible methylolation sites in the melamine that on average are methylolated—that is, how many of the total of six hydrogen atoms of the primary amino groups of the melamine (1,3,5-triazine-2,4,6-triamine) have been replaced by a methylol group. A fully methylolated, monocyclic melamine resin, accordingly, has six methylol groups per triazine ring (hexamethoxymethyl-melamine). The degree of methylolation must therefore always adopt a value of ≤6.

The reactivity of the melamine resins is frequently modified or lowered by complete or partial etherification of the methylol groups with various alcohols, in order, for example, to regulate the crosslinking affinity and at the same time to vary the solubility of the resins. Monohydric or polyhydric alcohols are suitable for the etherification. In one or more embodiments, monohydric alcohols are used for the etherification. It is possible, for example, to use methanol, ethanol, n-butanol, isobutanol or else hexanol for the etherification. Preference is given in general to methanol, n-butanol, and isobutanol. It is also possible to use mixtures of different alcohols, as for example a mixture of methanol and n-butanol. The degree of etherification of a melamine resin in this context then describes the fraction of methylol groups in the melamine-formaldehyde resin that have been etherified with an alcohol. Examples of monocyclic, fully methylolated and fully alcohol-etherified melamine-formaldehyde resins are hexamethoxybutyl-melamine or hexamethoxymethylmelamine (HMMM).

As is known, the molecular weight of a melamine-formaldehyde resin may likewise influence the reactivity, more particularly the reactivity for self-condensation and/or the crosslinking reactivity with, for example, OH-functional polymers. For instance, those of relatively high molecular mass (for example, polycyclic melamine-formaldehyde resins) generally have a higher reactivity than those of low molecular mass (for example, monocyclic melamine-formaldehyde resins).

The melamine-formaldehyde resins described may as is known be obtained from various suppliers. These melamine-formaldehyde resins, optionally in solution in corresponding organic solvents, as for example n-butanol, may then be employed directly in coating compositions, as for example paints. Known product types are obtained, for example, from Cytec (for example, Cymel® product line) or BASF (for example, Luwipal® product line). Obtainable in these cases, for example, are products with various degrees of methylolation, degrees of etherification or degrees of condensation (monocyclic or polycyclic).

The melamine-formaldehyde resins for use in the clearcoat coating composition of the invention are resins which are etherified with butanol, preferably n-butanol. This means that at least some of the methylol groups present are etherified with butanol, preferably n-butanol (butanol-etherified melamine-formaldehyde resins). At the same time it is necessary to use melamine-formaldehyde resins which have a high reactivity. As described above, high reactivities can be achieved, for example, through a high level of unmethylolated N—H units (high-imino melamine-formaldehyde resins). The increase in molecular weight already identified above may also contribute to an increase in the reactivity.

Accordingly, the at least one melamine-formaldehyde resin (B) and the at least one melamine-formaldehyde resin (C) are butanol-etherified melamine-formaldehyde resins. The reactivity of both resins, (B) and (C), is significantly higher than for the melamine-formaldehyde resins which are known generally to be of low reactivity and which have a high degree of methylolation and of etherification, HMMM being an example. The resins (B) and (C) differ, however, on the basis of their reactivity. The resin (B) is more reactive than the resin (C). It has surprisingly emerged that the very use of two melamine-formaldehyde resins having different reactivities allows the objects of the invention to be achieved and, in particular, an outstanding appearance of the ultimately resultant paint coat to be obtained. The reactivity of a melamine-formaldehyde resin is specified in the context of the present invention by reference to the crosslinking onset temperature, with lower crosslinking onset temperatures, of course, denoting a higher reactivity. In the context of the present invention, the crosslinking onset temperature is determined using the measurement method of Dynamic Mechanical Analysis (DMA), which was described earlier on above and which is known per se to the skilled person in the field. The crosslinking onset temperature of the melamine resins (B) and (C) is reported in accordance with the invention in relation to a standard, namely the monocyclic, fully methylolated and fully etherified HMMM.

The crosslinking onset temperature of the at least one melamine-formaldehyde resin (B) is between 65° C.-100° C., preferably between 70° C.-90° C., lower than the crosslinking onset temperature of HMMM.

The crosslinking onset temperature of the at least one melamine-formaldehyde resin (C) is between 30° C.-70° C., preferably between 40° C.-55° C., lower than the crosslinking onset temperature of HMMM.

The HMMM which serves as reference may be obtained, for example, likewise as a commercial product. The compound in question may more particularly be Luwipal® 066 (BASF).

As already described, the reactivity of melamine-formaldehyde resins is determined more particularly by the degree of methylolation and/or the fraction of free imino groups. The resins (B) and (C), accordingly, are designated generally as high-imino melamine-formaldehyde resins. A typical commercially available melamine-formaldehyde resin (B) is Luwipal® 014 (BASF). A typical commercial available melamine-formaldehyde resin (C) is Luwipal® 018 (BASF).

In one or more embodiments, the fraction of the at least one melamine-formaldehyde resin (B) is 2% to 10% by weight, more particularly 3% to 8% by weight, very particularly 4% to 6% by weight, based in each case on the total amount of the clearcoat coating composition of the invention.

In one or more embodiments, the fraction of the at least one melamine-formaldehyde resin (C) is 5% to 20% by weight, more particularly 7.5% to 17.5% by weight, very particularly 10% to 15% by weight, based in each case on the total amount of the clearcoat coating composition of the invention.

In one or more embodiments, the fraction of the resin (C) is greater than the fraction of the resin (B).

Besides the melamine-formaldehyde resins (B) and (C), the clearcoat coating composition of the invention may also comprise further melamine resins as well.

Further melamine resins which can be employed with particular advantage in the context of the present invention, as well as melamine-formaldehyde resins other than the resins (B) and (C), are the formaldehyde-free alkoxycarbonylaminotriazines, more particularly the tris(alkoxycarbonylamino)-1,3,5-triazines (TACTs). These melamine resins are melamine adducts which instead of the etherified or unetherified methylol groups are carbamate-functional. In the case of the preferred tris(alkoxycarbonylamino)-1,3,5-triazines, for example, each primary amino group of a melamine is functionalized with a carbamate unit.

In one or more embodiments, the clearcoat coating composition of the invention therefore comprises at least one tris(alkoxycarbonylamino)-1,3,5-triazine (TACT). Particularly preferred tris(alkoxycarbonylamino)-1,3,5-triazines possess a structure of the following formula (I):

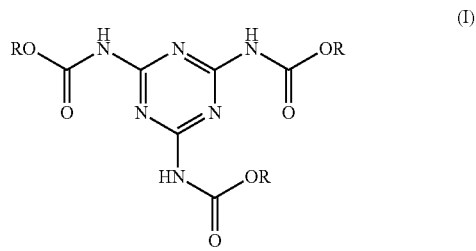

where $R=C_nH_{2n+1}$ with n=1 to 10, more particularly methyl or butyl.

In embodiments, where there is at least one tris(alkoxycarbonylamino)-1,3,5-triazine present, more particularly at least one TACT of the formula (I), it has a fraction of 0.5% to 10% by weight, more particularly 0.8% to 7.5% by weight, more specifically 1% to 5% by weight, based in each case on the total amount of the clearcoat coating composition of the invention.

In the context of the fraction ranges indicated above, the amounts of the melamine-formaldehyde resins (B) and (C) and also of the optionally present tris(alkoxycarbonylamino)-1,3,5-triazines (TACTs) are preferably to be selected such that in the case of such a combination the weight ratio of the melamine-formaldehyde resins (B) and (C) to the tris(alkoxycarbonylamino)triazines is in the range from 2:1 to 15:1, more particularly from 4:1 to 12:1, very particularly from 6:1 to 10:1.

Organic Urea Compound as Rheological Assistant (D)

The clearcoat coating composition of the invention comprises at least one organic urea compound (D) as rheological assistant.

In one or more embodiments, these urea compounds are adducts of one or more polyisocyanates, more particularly one polyisocyanate, with one or more amines, more particularly one or more monoamines, more particularly one monoamine.

Polyisocyanates which can be used are in principle all organic compounds containing at least two isocyanate groups per molecule. It is also possible to use isocyanate-group-containing reaction products of, for example, polyols and polyamines and polyisocyanates. In one or more embodiments, diisocyanates are used, very specifically aliphatic diisocyanates, more particularly hexamethylene diisocyanate. Examples of polyisocyanates which can be used are the following: tetramethylene 1,4-diisocyanate, hexamethylene 1,6-diisocyanate, cyclohexyl 1,4-diisocyanate, dicyclohexylmethane 4,4-diisocyanate, 1,5-dimethyl-(2,4-omega-diisocyanato-ethyl)benzene, 1,3,5-trimethyl-(2,4-omega-diisocyanato-methyl)benzene, 1,3,5-triethyl-(2,4-omega-diisocyanato-methyl)benzene, the trimer of hexamethylene 1,6-diisocyanate, isophorone diisocyanate, toluene 2,4-diisocyanate and toluene 2,6-diisocyanate. In one or more specific embodiment, hexamethylene 1,6-diisocyanate is used.

In one or more embodiments, amines used are primary monoamines, more particularly araliphatic or aliphatic primary monoamines. Examples of amines which can be used include the following: benzylamine, ethylamine, methoxypropylamine, n-propylamine, isopropylamine, n-butylamine, isobutylamine, tert-butylamine, pentylamine, n-hexylamine, n-octylamine, isononanylamine, isotridecylamine, n-decylamine, stearylamine or else ethylenediamine. In one or more specific embodiments, benzylamine is used.

In one or more embodiments, the organic urea compound (D) is used in the form of a paste mixed with at least one typical organic solvent as described later on below and also with at least one polyester, as for example a polyester (A), and/or with a meth(acrylate) co(polymer), specifically a (meth)acrylate (co)polymer (DD) as described below, in the clearcoat coating composition of the invention. Thus, for example, the preparation of the urea compound may take place directly in the presence of a polyester and/or a (meth) acrylate (co)polymer. In this case, for example, the procedure is such that the aliphatic primary monoamine is added to a solution of a (meth)acrylate (co)polymer and/or polyester in an organic solvent or in a mixture of organic solvents, and then the polyisocyanate is added. The organic solvents contemplated are described later on below and are more particularly selected such that they do not undergo any destructive interactions with the constituents present during the reaction—that is, with the at least one amine, the at least one polyisocyanate, and the at least one (meth)acrylate (co)polymer and/or polyester. In one or more embodiments, the fractions of the urea compound as a proportion of the clearcoat coating composition, as are described below, relate, however, even in the case of a paste, exclusively to the urea compound and not to the mixture of urea compound and (meth)acrylate (co)polymer and/or polyester. The actual amount of urea compound may therefore be calculated for example in a simple way by the amounts of polyisocyanate and amine that are used.

The resultant paste, in other words the mixture of rheological assistant containing urea groups and (meth)acrylate (co)polymer and/or polyester, preferably (meth)acrylate (co)polymer, with organic solvents, can then be used directly in the clearcoat coating composition of the invention.

Urea compounds as the adduct of a polyisocyanate and amines as mixtures with, for example, (meth)acrylate (co) polymers or polyesters are also available, for example, under the trade names Setalux® and Setal® (from Nuplex Resins) and can be used unproblematically in the clearcoat coating composition of the invention.

In one or more specific embodiments, the organic urea compound (D) is with used in the form of a paste, mixed with at least one organic solvent and with at least one (meth)acrylate (co)polymer (DD) as described below.

In one or more embodiments, the fraction of the at least one organic urea compound (D) as a rheological assistant is 0.1% to 4% by weight, more particularly 0.2% to 3% by weight, very particularly 0.3% to 2% by weight, especially particularly 0.4% to 1% by weight, based in each case on the total amount of the clearcoat coating composition.

(Meth)Acrylate (Co)Polymer (DD)

In one or more embodiments, the clearcoat coating composition of the invention comprises at least one (meth) acrylate (co)polymer (DD) as described below. As described above, for example, the paste of the at least one urea compound (D), the use of this paste being preferred, preferably comprises at least one such (meth)acrylate (co) polymer (DD). The (meth)acrylate (co)polymer (DD) may, however, of course be used in or present in the clearcoat coating composition even without prior mixing with a urea compound (D) to form a paste.

A (meth) acrylate (co)polymer is, as is known, a polymeric organic compound composed of various acrylate and/or methacrylate monomers. As used herein, the designation "(meth)acrylate" stands for acrylates and/or methacrylates and, respectively, for those compounds which contain acrylates and/or methacrylates or are constructed therefrom. Examples of such acrylate and methacrylate monomers include various alkyl (meth)acrylates and cycloalkyl (meth)acrylates, such as, for example, the following compounds known to the skilled person: ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates or also cyclopentyl acrylate, cyclopentyl methacrylate, isobornyl acrylate, isobornyl methacrylate, cyclohexyl acrylate and cyclohexyl methacrylate.

The (meth)acrylate (co)polymer (DD) is OH-functional and has an OH number of 60-200 mg KOH/g, specifically 70-180 mg KOH/g, very specifically of 90-170 mg KOH/g. Incorporated, accordingly, into the polymer scaffold are certain fractions of those acrylate and methacrylate monomers which have OH groups and therefore account for the OH functionality of the (meth)acrylate (co)polymer (DD).

Hydroxyl-containing monomer units used for preparing the (meth)acrylate (co)polymers (DD) are hydroxyalkyl (meth)acrylates, such as, for example, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate and, in particular, 4-hydroxybutyl acrylate and/or 4-hydroxybutyl methacrylate. As further monomer units for the (meth)acrylate (co)polymers (DD) it is possible to use vinylaromatic hydrocarbons, such as vinyltoluene, alpha-methylstyrene or, more particularly, styrene, amides or nitriles of acrylic or methacrylic acid, vinyl esters or vinyl ethers, and also, in minor amounts, in particular, acrylic and/or methacrylic acid.

The at least one (meth)acrylate (co)polymer (DD) has a glass transition temperature $T_g$ of −40° C. to 70° C., specifically of −35° C. to 50° C., very specifically of −35° C. to 35° C. As the skilled person in the field is aware, the glass transition temperature of (meth)acrylate (co)polymers is determined, for example, by the nature of the monomers present and the fractions thereof as a proportion of the polymer. An appropriate selection can be made by the skilled worker without substantial effort.

The molecular weight of the (meth)acrylate (co)polymer (DD) is within the ranges familiar to the skilled person, and is ultimately not subjected to any restrictions. Preference is given to weight-average molecular weights $M_w$ of between 7000 and 15 000 g/mol, more particularly 8000 and 13 000 g/mol, and number-average molecular weight $M_n$ of between 2000 to 4000 g/mol, more particularly between 2500 to 3500 g/mol.

In one or more embodiments, the acid number of the (meth)acrylate (co)polymer (DD) is between 0-50 mg KOH/g, more particularly between 0-30 mg KOH/g.

As (meth)acrylate (co)polymers (DD) it is possible to use not only customary commercially available products but also self-prepared (meth)acrylate (co)polymers. Examples of commercial (meth)acrylate (co)polymers (DD) include polyacrylates from the "Macrynal" product line (Cytec Surface Specialities) or the commercial product Setalux 1756 VV-65 (Nuplex Resins).

The preparation of the (meth)acrylate (co)polymers (DD) has no peculiarities in terms of methodology, but instead takes place, for example, by means of the methods, customary and known in the polymers sphere, of continuous or batchwise, radically initiated copolymerization in bulk, solution, emulsion, miniemulsion or microemulsion, under atmospheric pressure or superatmospheric pressure, in stirred tanks, autoclaves, tube reactors, loop reactor or Taylor reactors at temperatures of preferably 50 to 200° C.

Examples of suitable copolymerization processes are described in patent applications DE 197 09 465 A1, DE 197 09 476 A1, DE 28 48 906 A1, DE 195 24 182 A1, DE 198 28 742 A1, DE 196 28 143 A1, DE 196 28 142 A1, EP 0 554 783 A1, WO 95/27742 A1, WO 82/02387 A1 or WO 98/02466 A1.

Examples of suitable radical initiators are dialkyl peroxides, such as di-tert-butyl peroxide or dicumyl peroxide, hydroperoxides, such as cumene hydroperoxide or tert-butylhydroperoxide, peresters, such as tert-butyl perbenzoate, tert-butyl perpivalate, tert-butyl per-3,5,5-trimethylhexanoate or tert-butyl per-2-ethylhexanoate, peroxodicarbonates, potassium, sodium or ammonium peroxodisulfate, azo initiators, as for example azodinitriles such as azobisisobutyronitrile, C—C-cleaving initiators such as benzpinacol silyl ethers, or a combination of a nonoxidizing initiator with hydrogen peroxide. Combinations of the above-described initiators may also be used.

Other examples of suitable initiators are described in German patent application DE 196 28 142 A1, page 3 line 49 to page 4 line 6. It is possible, furthermore, to use thiocarbonylthio compounds or mercaptans such as dodecyl mercaptan as chain-transfer agents or molecular-weight regulators.

In one or more embodiments, the fraction of the at least one (meth)acrylate (co)polymer (DD) is 5% to 20% by weight, more particularly 6% to 15% by weight, more particularly 7.5% to 12.5% by weight, based in each case on the total amount of the clearcoat coating composition of the invention.

In one specific embodiment, the clearcoat coating composition of the invention comprises at least two (meth)acrylate (co)polymers (DD), with at least one of the two acrylates having a $T_g$ of −35° C. to 35° C., an OH number of 90-170 mg KOH/g, an acid number of 0-30 mg KOH/g, a number-average molecular weight $M_n$ of 2000-4000 g/mol, and a mass-average molecular weight of 7000-15 000 g/mol.

Acid Catalyst (E)

The clearcoat coating composition of the invention further comprises at least one acid catalyst (E). As is known, such catalysts are used, for example, in coating compositions in which the resins employed therein crosslink by corresponding polycondensation reactions in the course of curing. Exemplary resins in this connection are, in particular, hydroxyl-functional resins such as polyesters and/or (meth)acrylate (co)polymers, and also melamine-formaldehyde resins. Through the use of the catalysts and through their known mechanisms of action (acid catalysis), the crosslinking reactions are catalyzed and hence the baking temperatures are lowered, the baking times are shortened, or else complete curing is actually made possible.

In one or more embodiments, the acid catalysts (E) are organic acids, more particularly sulfonic acids, carboxylic acids, phosphoric acids and/or acidic phosphoric esters. In specific embodiments, the acid catalysts (E) are sulfonic acids.

In one or more embodiments, the stated acid catalysts are used in blocked form. As a result, as is known, improvement is obtained in, for example, the shelf life of the compositions comprising the catalysts. Examples of suitable blocking agents are amines such as preferably tertiary-alkylated or heterocyclic amines.

Examples of suitable sulfonic acids are dodec-ylbenzenesulfonic acid (DDBSA), dinonylnaphthalenedi-sulfonic acid (DNNSA), para-toluenesulfonic acid (pTSA), and blocked sulfonic acid catalysts such as blocked DDBSA, blocked DNNSA or blocked p-TSA.

This blocking of the sulfonic acid catalysts takes place, for example, likewise via amines such as preferably tertiary-alkylated or heterocyclic amines, such as 2-amino-2-methylpropanol, diisopropanolamine, dimethyloxazolidine or trimethylamine, for example. Also possible is the use of covalently blocked sulfonic acid catalysts. In this case, blocking takes place using covalently bonding blocking agents such as epoxy compounds or epoxy-isocyanate compounds, for example. Blocked sulfonic acid catalysts of these kinds are described in detail in the patent publication U.S. Pat. No. 5,102,961.

In one or more embodiments, amine-blocked sulfonic acid catalysts are used. Such catalysts are available, for example, under the trade name CYCAT® (from Cytec) or else Nacure® (from King Industries), and can be used directly in the clearcoat coating composition of the invention.

The acid catalyst or catalysts (E), more particularly sulfonic acid catalysts, are used in the customary and known amounts. In one or more embodiments, 0.01% to 3% by weight is used, more particularly 0.05% to 2% by weight, very particularly 0.1% to 1% by weight, based in each case on the total amount of the clearcoat coating composition.

Other Possible Constituents of the Clearcoat Coating Composition of the Invention The clearcoat coating composition of the invention may further comprise at least one organic solvent. In one or more embodiment, it does include such a solvent—that is, it is solvent-containing.

Especially suitable as organic solvents are those which in the clearcoat coating composition are chemically inert with respect to the compounds (A), (B), (C), (D), (DD), (E), and (F) and also any other constituents present, and which, even during the curing of the clearcoat produced from the clearcoat coating composition of the invention, do not react with (A), (B), (C), (D), (DD), (E), and (F) and also any other constituents present. The skilled person is able to select suitable solvents easily on the basis of their known solvency and their reactivity.

Examples of such solvents are aliphatic and/or aromatic hydrocarbons such as butyl glycol, toluene, xylene, solvent naphtha, Solvesso 100, or Hydrosol® (from ARAL), ketones, such as acetone, methyl ethyl ketone or methyl amyl ketone, esters, such as ethyl acetate, butyl acetate, butyl glycol acetate, pentyl acetate or ethyl ethoxypropionate, ethers, alcohols such as butanol and butyl diglycol, or mixtures of the aforementioned solvents.

The fraction of the at least one organic solvent may vary widely and may be situated for example in the range between 20% to 65% by weight, based on the total amount of the clearcoat coating composition. In one or more embodiments, it is between 25% to 60% by weight, more particularly between 30% and 55% by weight. An advantage of the clearcoat coating composition of the invention, however, is that it can contain lower levels of organic solvents in comparison to known solvent-containing clearcoat coating compositions which have similar or even poorer technological properties (for example gloss or appearance). In this way, with the technological properties retained or improved at the same time, there may also be, for example, an increase in the NVF, it being ultimately possible, as a result, for material to be saved and hence for operation to be significantly more economical and in turn more environmentally safe.

In one or more embodiments, the solids or NVF of the clearcoat coating composition of the invention is between 35% and 80%, more particularly between 40% and 75%, very particularly between 45% by weight to 70%.

In one or more embodiments, the constituents (A), (B), (C), (D), and (E) described account for more than 30% by weight, more particularly more than 35% by weight, of the total amount of the clearcoat coating composition of the invention. Where an organic solvent is present, the constituents (A), (B), (C), (D), and (E) described and the solvent account more particularly for more than 70% by weight, specifically more than 75% by weight, of the total amount of the clearcoat coating composition of the invention. In the event that constituent (DD) is additionally present, the constituents (A), (B), (C), (D), (DD), (E) and the solvent account more particularly for more than 85% by weight, specifically more than 90% by weight, of the total amount of the clearcoat coating composition of the invention.

This means more particularly that the clearcoat coating composition of the invention may comprise at least one further constituent, as for example a customary coatings additive as described in more detail below, in customary amounts of less than 10% by weight, more particularly less than 5% by weight.

Further constituents which may be present include, for example, other organic polymeric compounds that are different from the polyesters (A), (meth)acrylate (co)polymers (DD), and melamine resins (B) and (C). The stated, optionally present constituents may be, for example, linear, branched and/or comb (co)polymers of at least one monomeric compound that are of random, alternating and/or blocklike construction. Ultimately contemplated, apart from the polyesters (A), (meth)acrylate (co)polymers (DD), and melamine resins (B) and (C) described earlier on above, are all typical organic compounds known to the skilled person in this context.

Present more particularly may be further linear, branched and/or comb (co)polymers, of random, alternating, and blocklike construction, of ethylenically unsaturated monomers. Besides the stated (meth)acrylate (co)polymers (DD), for example, there may also be further (meth)acrylate (co)polymers, different from the (meth)acrylate (co)polymers (DD), present in the clearcoat coating material compositions. Examples of further suitable (co)polymers of ethylenically unsaturated monomers include, in addition to the (meth)acrylate (co)polymers already comprehensively described, partially hydrolyzed polyvinyl esters.

There may also be further polyaddition resins and/or polycondensation resins present. Examples of suitable polyaddition resins and/or polycondensation resins are polyesters other than the polyesters (A), and alkyds, polyurethanes, polylactones, polycarbonates, polyethers, epoxy resin-amine adducts, polyamides, polyimides, polyester-polyurethanes, polyether polyurethanes, and polyester-polyether-polyurethanes. Also present, for example, may be amino resins other than the melamine-formaldehyde resins (B) and (C) and TACT, such as the urea resins and thiourea reins that are known per se, or else benzoguanamine-formaldehyde resins and acetoguanamine-formaldehyde resins.

Likewise present in the clearcoat coating composition of the invention may be, for example, blocked organic polyisocyanates. In principle it is possible here to use all organic compounds containing at least two isocyanate groups per molecule, examples being the polyisocyanates identified earlier on above. Examples of typical blocking agents in this context are phenols, alcohols, oximes, pyrazoles, amines, and CH-acidic compounds such as diethyl malonate, more particularly caprolactam, butanone oxime, acetone oxime, diethyl malonate, dimethyl pyrazole or phenol. The blocking reaction is carried out typically by reacting the free NCO groups with the stated blocking agents in the presence for example of catalysts such as dibutyltin dilaurate or tin(II) bis(2-ethylhexanoate). The blocking agents and the corresponding conversion reactions are known to the skilled person.

As further constituents there may also be at least one customary coatings additive known per se present in the clearcoat coating composition of the invention. Coatings additives of this kind are known to the skilled person and can be selected according to the case in hand.

Coatings additives suitable more particularly are
especially, UV absorbers;

especially, light stabilizers such as HALS compounds, benzotriazoles or oxalanilides;

nonhiding, transparent fillers, such as $SiO_2$ nanoparticles, barium sulfate, and zinc oxide;

radical scavengers;

slip additives;

polymerization inhibitors;

defoamers;

reactive diluents of the kind known in general from the prior art;

wetting agents such as siloxanes, fluorine-containing compounds, and carboxylic monoesters;

adhesion promoters such as tricyclodecanedimethanol;

further rheological assistants, different from the above-described rheological assistants (D), such as, in particular, polyamides (available for example under the trade name Disparlon) or else fumed silicas (available under the trade name Aerosil, for example), or dispersions thereof in corresponding resins as binders;

film-forming assistants such as cellulose derivatives;

and/or flame retardants.

The clearcoat coating composition of the invention can be cured, for example, thermally. For this purpose it comprises, for example, the at least one polyester (A), the at least one (meth)acrylate (co)polymer (DD), and the at least one melamine resin (B).

As used herein, the term "curable thermally" or the term "thermal curing" denotes the crosslinking of a coat of paint (formation of the coating film) that takes place by chemical reaction of reactive functional groups, the energetic activation of this chemical reaction being possible through thermal energy. As the skilled person knows, in various cases the additional use of certain catalysts is desirable or necessary for this curing, in order to accelerate or allow the curing reaction. Here, different functional groups, which are complementary to one another, may react with one another (complementary functional groups), and/or film formation is based on the reaction of autoreactive groups, in other words of functional groups which react with one another—with groups of their kind. Examples of suitable complementary reactive functional groups and autoreactive functional groups are known from German patent application DE 199 30 665 A1, for example, page 7 line 28 to page 9 line 24.

Under the common curing conditions, as for example the curing conditions described below, as is known, such crosslinking thus occurs in any case for the clearcoat coating composition of the invention, more particularly through the crosslinking of the hydroxy-functional polyester (A) and of the melamine resins (B) and (C).

Systems possible in this context are the one-component (1C) and multicomponent systems that are known per se, more particularly two-component (2C) systems.

In one-component (1C) systems, the components to be crosslinked are present alongside one another, in other words in one component. A requirement for this, for example, is that the components to be crosslinked undergo crosslinking only at relatively high temperatures and/or as a result of the use of catalysts.

In two-component (2C) systems, the components to be crosslinked are present in two components, which are not combined until shortly before application. This form is selected when the components to be crosslinked react with one another even at room temperature, in other words at between 10 and 30° C., more particularly 25° C.

As a skilled person knows, the compounds present in the clearcoat coating composition of the invention, more particularly the at least one polyester (A) and the melamine resins (B) and (C), generally do not crosslink simply at room temperature. The clearcoat coating composition of the invention, accordingly, is preferably a one-component (1C) system. It may, however, of course also be present in the form of a two-component (2C) system. This is the case, for example, when the clearcoat coating composition of the invention comprises nonblocked polyisocyanates as described above.

As well as the clearcoat coating composition of the invention, a process for preparing the clearcoat coating composition of the invention is additionally provided by the present invention. For the process, of course, all of the advantageous embodiments as described above in relation to the constituents that are to be used or that can be used in the clearcoat coating composition of the invention are also applicable in respect of the process for preparing the clearcoat coating composition of the invention.

In terms of method, the preparation has no peculiarities, but instead takes place by the mixing and homogenizing of the above-described constituents by means of customary and known mixing methods and apparatus such as stirred tanks, agitator mills, extruders, compounders, Ultraturrax devices, in-line dissolvers, static mixers, toothed-wheel dispersers, pressure relief nozzles and/or microfluidizers, optionally with exclusion of actinic radiation. Here, however, it should be borne in mind that the organic urea compound (D) as described above is used preferably in the form of a paste mixed with at least one typical organic solvent and also with at least one polyester, as for example a polyester (A), and/or with a (meth)acrylate (co)polymer, more particularly one like (meth)acrylate (co)polymer (DD). In other words, the paste is first prepared separately and then mixed with the other constituents.

Additionally provided by the present invention is the use of the clearcoat coating composition of the invention. The clearcoat coating composition of the invention is suitable more particularly for use in automotive finishing, for producing clearcoats on various substrates, and is used accordingly. Also provided by the present invention, therefore, is a clearcoat produced from the clearcoat coating composition of the invention on a substrate. Of course, all of the advantageous embodiments as described above in relation to the constituents that are to be used or can be used in the clearcoat coating composition of the invention also apply in respect of the use of the clearcoat coating composition of the invention and of the clearcoat produced from it.

The application of the clearcoat coating composition of the invention to a substrate may be made by any of the customary application methods, such as, for example, spraying, knifecoating, spreading, pouring, dipping, impregnating, trickling or rolling. The substrate to be coated may itself be at rest, with the application equipment or unit being moved. Alternatively, the substrate to be coated, more particularly a coil, may be moved, with the application unit being at rest relative to the substrate or being moved in a suitable way.

Preference is given to employing spray application methods, such as, for example, compressed-air spraying (pneumatic application units), airless spraying, high-speed rotation, electrostatic spraying application (ESTA), optionally in conjunction with hot spray application such as hot-air spraying, for example.

In one or more embodiments, the film thickness in the cured, dry state is between 10 and 150 micrometers, more particularly between 20 and 80 micrometers, very particularly between 25 and 70 micrometers.

Following application and prior to curing of the clearcoat coating composition of the invention, there may be a certain rest time or evaporation time of, for example, 1 minute to 60 minutes, more particularly 2 minutes to 10 minutes. The rest time serves, for example, for the leveling and degassing of the coats of paint or for the evaporation of volatile constituents such as solvents. The rest time may be spent at room temperature, in other words between 10 and 30° C., or else may be assisted and/or shortened by the application of elevated temperatures and/or by a reduced air humidity, provided this does not entail damage or alteration to the coats of paint, such as premature complete crosslinking, for instance.

Following the application and, where practiced, the evaporation time of the clearcoat coating composition of the invention on a substrate, curing takes place, to form a clearcoat.

The thermal curing of the clearcoat coating composition of the invention has no peculiarities in terms of method but instead takes place in accordance with the customary and known methods such as heating in a forced-air oven or irradiation with IR lamps. The thermal curing here may also take place in stages. Another method of curing is that of curing with near infrared (NIR radiation). Curing is carried out in general at a temperature of 10 to 200° C., more preferably 50 to 190° C., and more particularly 80 to 180° C., for a time of, for example, 1 minute to 10 hours, more preferably 2 minutes to 2 hours, and more particularly 5 minutes to 60 minutes. In embodiments where the one-component clearcoat coating systems that are employed, curing takes place at a temperature of 80 to 180° C. for a time of 5 minutes to 60 minutes.

Either the substrate is coated directly (single-coat finishing) or else the clearcoat is formed on existing coats of paint, applied beforehand and optionally dried and/or cured, in which case a multicoat paint system is the result. In one or more embodiments, multicoat paint systems on metallic substrates or plastics substrates are used. In one or more specific embodiments, multicoat paint systems on metallic substrates usually consist—as considered in the stated order starting from the substrate—of a conversion coating (phosphatizing, for example), an electrocoat, a primer-surfacer coat, a basecoat, and the clearcoat of the invention. The coating materials which can be used in these cases, their compositions, film thicknesses to be selected, and also methods of application and of curing, are known to and can be easily selected by the skilled person on the basis of his or her art knowledge. In the case of plastics substrates, the customary primer-surfacer, single-coat topcoat, and basecoat coating compositions which can be used in plastics finishing, and whose selection and use are known to the skilled person, are employed, and atop them the clearcoat coating composition of the invention is then applied, resulting in the clearcoat of the invention. The individual coats of the multicoat paint systems may each be cured individually, or else the multicoat paint systems are produced by the wet-on-wet method, which is known per se—the individual coats are applied, merely flashed off briefly and/or subjected to preliminary drying, without complete crosslinking occurring, and then jointly cured. Combinations are of course also possible. Thus, for example, electrocoat and primer-surfacer may each be cured separately, while the subsequently applied basecoat and clearcoat coating compositions are cured jointly.

In one or more embodiments, the substrate is a metallic substrate or a plastics substrate, of the kind used for producing bodywork parts and/or parts for installation in or on vehicles in automaking. In one or more specific embodiments, the substrate is a metallic substrates.

The invention is described in more detail below, using working examples.

EXAMPLES

Preparation Example 1

Synthesis of a Polyester (A)

In a 3.5 L reactor provided with a stirrer, reflux condenser, and water separator, 678.1 g of isononanoic acid and 364.8 g of pentaerythritol are combined. Xylene (azeotrope former) is added to the water separator, and the reaction mixture is heated to 160° C. After 120 minutes, the water separator is emptied and the reaction mixture is cooled to 100° C. After cooling has taken place, a packed column is installed. Then 287.4 g of trimethylolpropane, 826.4 g of hexahydro-phthalic anhydride, and 343.4 g of 2-butyl-2-ethyl-1,3-propanediol are added and the reaction mixture is heated slowly to a maximum of 220° C. The column overhead temperature here must not exceed 85° C. In order to monitor the course of reaction, the volume of the condensate (water in the water separator) is recorded as well, and from time to time a sample of the reaction mixture (product melt) is taken for determination of the acid number. When the amount of condensate calculated beforehand, corresponding to complete conversion, has been reached, the xylene fraction is removed by distillation. The reaction mixture is stirred at 220° C. until an acid number of 11.5 to 13.5 mg KOH/g is reached. The mixture is cooled to 145° C. and diluted with solvent naphtha to a solids of 63±2%.

The resulting polyester has a solids fraction of 63±2% and a viscosity of 450-650 mPa·s (determined in accordance with DIN EN ISO 2884-1; Brookfield 03/10 000 1/s). The resulting hydroxyl number is 164 mg KOH/g, the weight-average molecular weight $M_w$ is 3349 g/mol, and the number-average molecular weight $M_n$ is 1193 g/mol.

Preparation Example 2

Synthesis of a Paste Comprising a Rheological Assistant (D)

a)

A 5 L Juvo reaction vessel with heating jacket, thermometer, stirrer, and top-mounted condenser was charged with 875.7 g of an aromatic solvent. With stirring and under an inert gas atmosphere (200 cm³/min nitrogen), the aromatic solvent was heated under superatmospheric pressure (max. 3.5 bar) to 160° C. With the aid of a metering pump, a mixture of 37.5 g of di-tert-butyl peroxide and 138.6 g of an aromatic solvent was added dropwise at a uniform rate over the course of 4.75 h. 0.25 h after the beginning of the addition, a metering pump was used to add 848.4 g of styrene, 600.0 g of n-butyl acrylate, 418.2 g of hydroxyethyl methacrylate, and 38.4 g of methacrylic acid at a uniform rate over the course of 4 h. After the end of the addition, the temperature was maintained for 2 h and then the product was cooled to 60° C. and filtered through a 5 μm GAF bag. The resulting resin had a $T_g$ of 24° C., an acid number of 15 mg KOH/g (to DIN 53402), a solids content of 65%+/−1, and a viscosity of 8.5 dPa*s in accordance with the test protocol of DIN ISO 2884-1 (55% in solvent naphtha PK (10), 23° C.). The resulting hydroxyl number is 95 mg KOH/g, the weight-average molecular weight $M_w$ is 8600 g/mol, and the number-average molecular weight $M_n$ is 3300 g/mol.

b)

A 1 L reactor was filled with 423.5 g of the resin solution from step a) and diluted with 29.4 g of butyl acetate. Then 11.2 g of benzylamine were added and the mixture was stirred for 30 minutes. After this time, with application of high shearing forces, a mixture of 8.8 g of hexamethylene diisocyanate and 17.1 g of butyl acetate was added at a rate such that the reaction temperature did not exceed 40° C. The resulting mixture had a viscosity of >800 mPas (10 s$^{-1}$) (Z3) (DIN ISO 2884-1) and a solids content of 59.0%.

Preparation of Clearcoat Coating Compositions

In accordance with Table 1, a composition of the invention and a comparative composition were prepared by mixing of their constituents and homogenization of the resulting mixtures (figures in Table 1 in parts by weight). Immediately prior to application to a substrate, as described below, the completed formulas were adjusted to the same spray viscosity (26 seconds DIN 4 flow time at 20° C.) with a mixture of solvent naphtha 160/180 (20%), solvent naphtha 180/210 (35%), xylene (25%), butyl acetate (8.5%), and butanol (11.5%). At spray viscosity, the clearcoat coating composition of the invention had a solids content (NVF) of 46.9%. The NVF of the comparative composition at spray viscosity was only 43.1%.

TABLE 1

Composition of the clearcoat coating compositions

| Constituent | Comparative | Inventive |
| --- | --- | --- |
| Polyester (A) as per preparation example 1 | | 34.800 |
| Commercial acrylate resin solution (NVF 60%, OH number 128) | 33.800 | |
| Melamine-formaldehyde resin (C) [1] | 24.300 | 17.400 |
| Melamine-formaldehyde resin (B) [2] | | 8.800 |
| Paste as per preparation example 2 | 17.000 | 20.000 |
| Cylink 2000 (from Cytec) [3] | 4.000 | 4.000 |
| Xylene | 1.185 | |
| Solvent naphtha | 7.250 | 5.500 |
| Commercial, silicone-containing surface additives | 0.115 | 0.200 |
| Commercial light stabilizers | 0.900 | 0.950 |
| Solvesso 150 | 4.700 | 6.100 |
| Butyl diglycol acetate | 1.000 | 1.100 |
| Butyl diglycol | 3.000 | |
| Butanol | 2.000 | |
| Sulfonic acid catalyst (E)[4] | 0.150 | 0.150 |
| Sulfonic acid catalyst (E)[5] | | 0.100 |
| Commercial, acrylate-based flow control additive | 0.600 | |

Notes:
The reference resin HMMM (Luwipal ® 066, BASF) has a measured crosslinking onset temperature of 219° C.
[1] (Luwipal 018 BX from BASF, NVF 72% in butanol, crosslinking onset temperature 169° C.)
[2] (Luwipal 014 from BASF NVF 52% in butanol, crosslinking onset temperature 141° C.)
[3] TACT crosslinker (NVF 50% in butanol)
[4] CYCAT 4045 (35% active catalyst in ethylene glycol, from Cytec)
[5] Nacure 5076 (70% active catalyst in isopropanol, from King Industries)

Production and Properties of Multicoat Coatings

Multicoat coatings were built up on cathodically electrocoated (CathoGuard 320) steel panels (Gardobond 26S 60° C.). All of the coating materials were applied by ESTA application. First of all a commercial aqueous gray/anthracite primer-surfacer was applied, was flashed off at 25° C. for 5 minutes and at 80° C. for 10 minutes, and then baked at 160° C. for 20 minutes (dry film thickness 30 micrometers). This was followed by the application of a commercial black waterborne basecoat, a 5-minute flash at 25° C., and a 10-minute drying at 80° C. (dry film thickness 12 micrometers). Lastly, the clearcoat coating compositions as per Table 1 were applied. The clearcoat coating compositions were likewise flashed off at 25° C. for 5 minutes and subsequently baked at 140° C. for 20 minutes (dry film thickness 40 micrometers).

The multicoat coatings produced in this way were investigated for leveling and for appearance. The analyses were made via Wavescan measurements (longwave/shortwave). The instrument used was a Wavescan II from Byk-Gardner. As is known, low values for LW/SW (longwave/shortwave) correlate with good leveling and with a resultant good and high-quality appearance (high distinctiveness of image (DOI), high surface smoothness). The results are set out in Table 2.

TABLE 2 results of measurement

| | Comparative | Inventive |
| --- | --- | --- |
| LW vertical | 7 | 5 |
| SW vertical | 24 | 19 |
| LW horizontal | 10 | 9 |
| SW horizontal | 22 | 17 |

Note:
the panels were coated once in a horizontal position and once in a vertical position, in order to replicate the application conditions for different areas on an automobile body.

The results show that the leveling and the resultant appearance of the multicoat coatings produced using the clearcoat coating composition of the invention are substantially better than for the comparative system. A further factor is that the clearcoat coating composition of the invention has a significantly higher solids, or lower level of organic solvents, and hence exhibits a markedly improved environmental profile.

What is claimed is:

1. A clearcoat coating composition comprising
   (A) at least one polyester having an OH number of 100-220 mg KOH/g, comprising
      (A1) 10 to 20 mol % of at least one acyclic, aliphatic, branched polyol having two hydroxyl groups,
      (A2) 5 to 15 mol % of at least one acyclic, aliphatic, branched polyol having three hydroxyl groups,
      (A3) 10 to 20 mol % of at least one acyclic, aliphatic, branched polyol having four hydroxyl groups,
      (A4) 25 to 40 mol % of at least one cycloaliphatic 1,2-dicarboxylic acid and/or the anhydride of this dicarboxylic acid, and
      (A5) 20 to 35 mol % of isononanoic acid,
   wherein the molar fractions are based in each case on the total molar fraction of the compounds (A1) to (A5) and wherein this total molar fraction accounts for at least 70 mol % of the compounds present in the polyester (A);
   (B) at least one melamine-formaldehyde resin etherified with n-butanol or isobutanol having a crosslinking onset temperature between 65° C.-100° C. lower than the crosslinking onset temperature of hexamethoxymethylmelamine;
   (C) at least one melamine-formaldehyde resin etherified with n-butanol or isobutanol having a crosslinking onset temperature between 30° C.-60° C. lower than the crosslinking onset temperature of hexamethoxymethylmelamine;

(D) at least one organic urea compound as rheological assistant; and (E) at least one acid catalyst.

2. The clearcoat coating composition of claim 1, comprising the at least one polyester (A) in an amount of 12% to 45% by weight, the at least one melamine-formaldehyde resin etherified with n-butanol or isobutanol (B) in an amount of 2% to 10% by weight, the at least one melamine-formaldehyde resin etherified with n-butanol or isobutanol (C) in an amount of 5% to 20% by weight, the at least one organic urea compound (D) as rheological assistant in an amount of 0.1% to 7% by weight, and the at least one acid catalyst in an amount of 0.01 to 3% by weight, based in each case on the total amount of the clearcoat coating composition.

3. The clearcoat coating composition of claim 1, further comprising at least one (meth)acrylate (co)polymer (DD) having a glass transition temperature of −40° C. to 70° C. and an OH number of 60 to 200 mg KOH/g.

4. The clearcoat coating composition of claim 2, further comprising at least one (meth)acrylate (co)polymer (DD) having a glass transition temperature of −40° C. to 70° C. and an OH number of 60 to 200 mg KOH/g in an amount of 5% to 20% by weight, based on the total amount of the clearcoat coating composition.

5. The clearcoat coating composition of claim 1, further comprising at least one organic solvent.

6. The clearcoat coating composition of claim 2, further comprising at least one organic solvent in an amount of 10% to 60% by weight, based on the total amount of the clearcoat coating composition.

7. The clearcoat coating composition of any of claim 1, further comprising at least one tris(alkoxycarbonylamino)-1,3,5-triazine, in an amount of 0.5% to 10% by weight, based on the total amount of the clearcoat coating composition.

8. The clearcoat coating composition of claim 1, wherein the at least one organic urea compound as rheological assistant is an adduct of a polyisocyanate and an araliphatic or aliphatic primary monoamine.

9. The clearcoat coating composition of claim 1, wherein the acid catalyst is a sulfonic acid catalyst selected from the group consisting of free sulfonic acids and amine-blocked sulfonic acids.

10. A process for preparing the clearcoat coating composition of claim 1, the process comprising mixing the components (A), (B), (C), (D), and (E).

11. The process of claim 10, wherein the urea compound is added in the form of a paste which comprises a mixture of the urea compound with a polyester and/or with a (meth)acrylate (co)polymer and at least one organic solvent.

12. The process of claim 11, wherein the paste comprises a (meth)acrylate (co)polymer (DD).

13. A method for producing a cured clearcoat on a substrate, the method comprising applying the clearcoat coating composition of claim 1 to a substrate and subsequently thermally curing at a temperature of 80 to 180° C.

14. The method of claim 13, wherein the substrate comprises a precoated substrate having an existing paint coat, and the clearcoat coating composition is applied to the precoated substrate and optionally cured beforehand, to produce a multicoat paint system.

15. A multicoat coating produced according to the method of claim 14.

* * * * *